United States Patent [19]

Swart et al.

[11] 3,774,806
[45] Nov. 27, 1973

[54] FISH HOOK SEPARATING, ORIENTATION, FEEDING AND GROUPING APPARATUS

[76] Inventors: Jerry E. Swart, P.O. Box 332; Homer Braudice Bennett, Jr., Rt. 1, both of Strong, Ark. 71765

[22] Filed: Nov. 21, 1972

[21] Appl. No.: 308,602

[52] U.S. Cl................ 221/162, 198/33 R, 221/296
[51] Int. Cl............................................. B65h 9/00
[58] Field of Search........................... 221/157–162, 176, 296; 198/33 R

[56] References Cited
UNITED STATES PATENTS

| | | | |
|---|---|---|---|
| 2,598,973 | 6/1952 | Chiaberta | 221/162 |
| 2,825,489 | 3/1958 | Batchelder | 221/162 X |
| 2,879,919 | 3/1959 | Knoche | 221/176 X |
| 2,988,247 | 6/1971 | Garrett | 221/162 |

Primary Examiner—Robert B. Reeves
Assistant Examiner—Thomas E. Kocovsky
Attorney—B. P. Fishburne, Jr.

[57] ABSTRACT

A rotary tumbler separates fish hooks from a random mass and delivers them onto a vibratory pick-up bar which is inclined, enabling the fish hooks to slide toward a feed bar. Improperly arranged hooks on the pick-up bar are removed and delivered back into the tumbler for recycling. Properly oriented fish hooks pass through a gaging slot in the inclined feed bar and while subjected to continued vibration gravitate toward a grouping or counting mechanism at the discharge end of the apparatus. Groups of fish hooks in predetermined numbers are readily removable for packaging. The apparatus possesses a number of critical adjustments to facilitate processing a full range of fish hook sizes.

15 Claims, 16 Drawing Figures

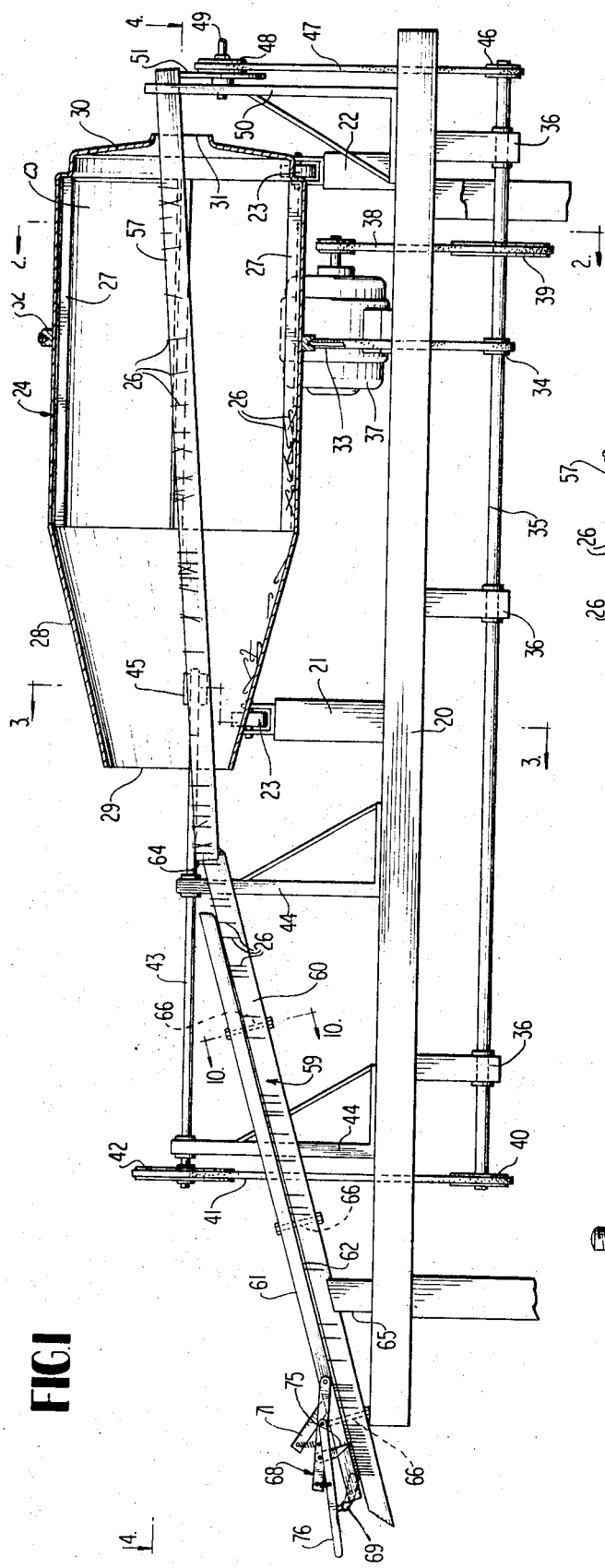
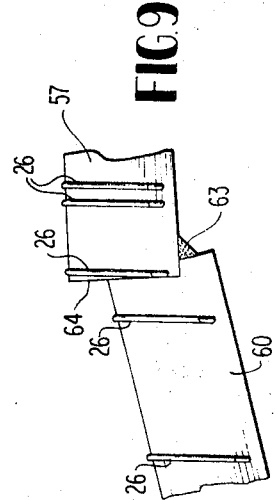
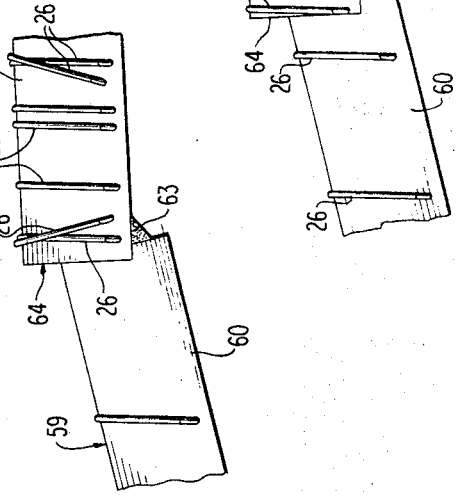
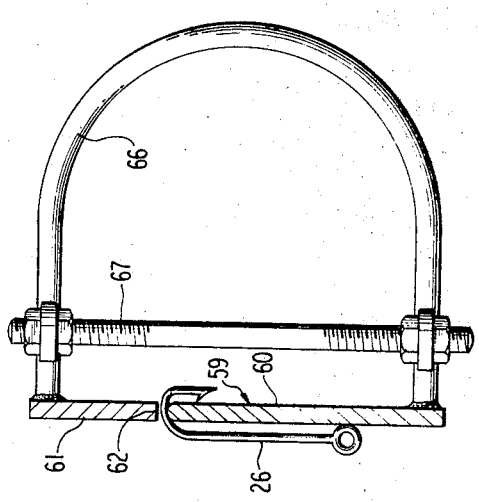

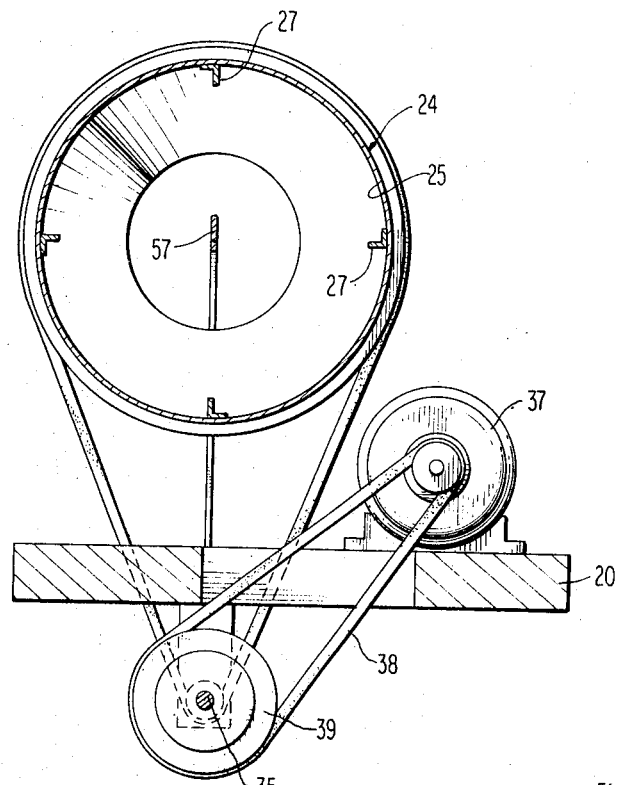
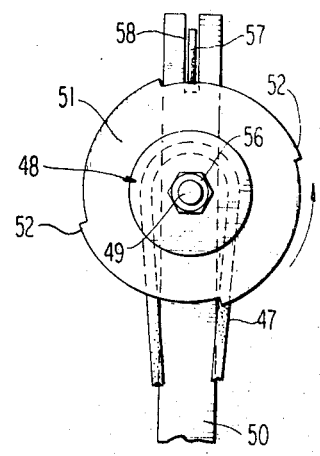
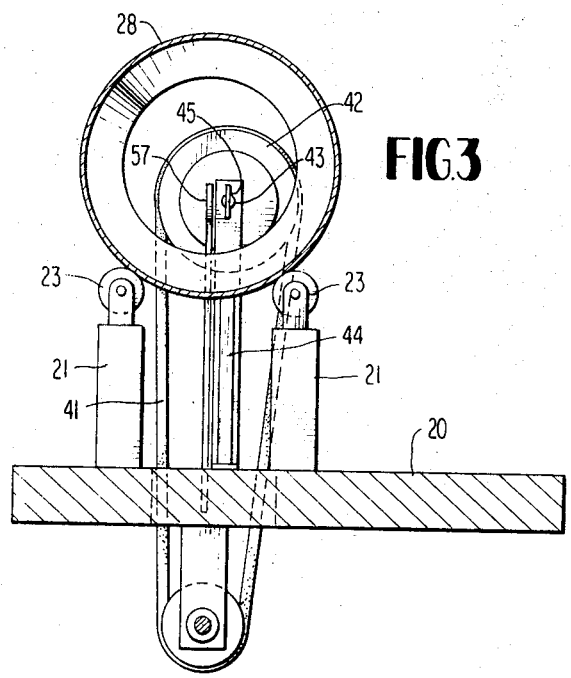
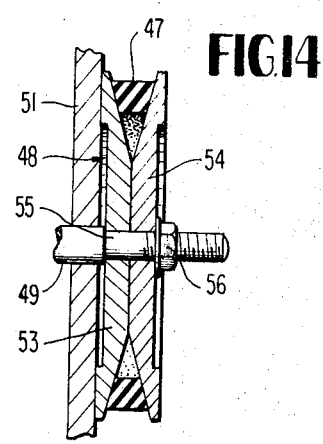
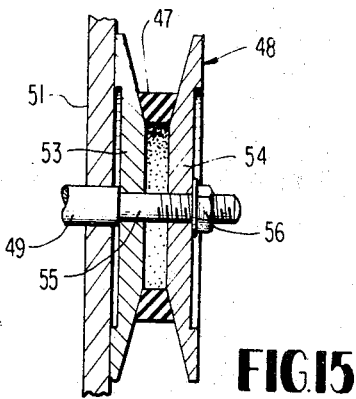

FISH HOOK SEPARATING, ORIENTATION, FEEDING AND GROUPING APPARATUS

BACKGROUND OF THE INVENTION

Mechanisms are known in the prior art for feeding and handling various types of small articles in large numbers. A few examples of such prior art devices are disclosed in U. S. Pats. Nos. 1,326,925, Goldberg; 2,879,919, Knoche; 2,913,099, Saltz; 2,972,433, Knoche; and 3,068,991, Prutton.

Fish hooks are extremely difficult to handle and to separate from tangled masses due to their shape and due to the fact that they possess barbs and eyes at their opposite ends. Because of these peculiarities of fish hooks and because they come in a variety of sizes, no known prior art apparatus is capable of processing them automatically on a commercial scale for packaging, including the steps of separating the hooks from a mass, and continually feeding them in an orderly and expeditious manner to a grouping or counting station. Up to the present time, the only feasible way to handle fish hooks has been by hand, and this is understandably very slow and uneconomical.

Accordingly, the essence of this invention is to provide an efficient, economical and reliable machine which can receive a tangled mass of fish hooks of any given size and can then automatically proceed to separate hooks systematically from the mass and deliver them to a supporting and feeding means which in turn conveys fish hooks in large numbers and in a steady stream properly oriented and separated to a counting or grouping station, where groups of hooks are removed for packaging. The human hand need not touch the hooks between the times when they are placed in the rotary tumbler until properly counted groups of oriented hooks are removed at the discharge end of the apparatus.

The apparatus has several very important adjustment features enabling the processing of a full range of fish hook sizes and several of these adjustments are quite necessary and critical for the apparatus to process the fish hooks in an entirely practical and efficient manner on a commercial scale.

Other features and advantages of the invention will become apparent during the course of the following detailed description.

DESCRIPTION OF DRAWING FIGURES

FIG. 1 is a side elevational view, partly in section, of a fish hook processing apparatus embodying the invention.

FIG. 2 is a transverse vertical section taken on line 2—2 of FIG. 1.

FIG. 3 is a similar section taken on line 3—3 of FIG. 1.

FIG. 5 is a fragmentary end elevational view of the apparatus with parts omitted showing a cam for producing vibration of a pick-up and feed bar assembly at required frequencies.

FIG. 8 is an enlarged fragmentary side elevation of a stepped connection between the pick-up and feed bars, forming an essential means in the complete separation and orientation of the moving fish hooks.

FIG. 9 is another view similar to FIG. 8 and further illustrating the operation of the stepped connection for separating crossed hooks.

FIG. 10 is an enlarged fragmentary section through the feed bar and its adjusting means taken on line 10—10 of FIG. 1.

FIGS. 14 and 15 are sectional views through a variable diameter cone pulley employed on the apparatus at two locations to allow regulation of the speed of rotation of the tumbler and of the vibration-inducing cam.

DETAILED DESCRIPTION

Figure 4:
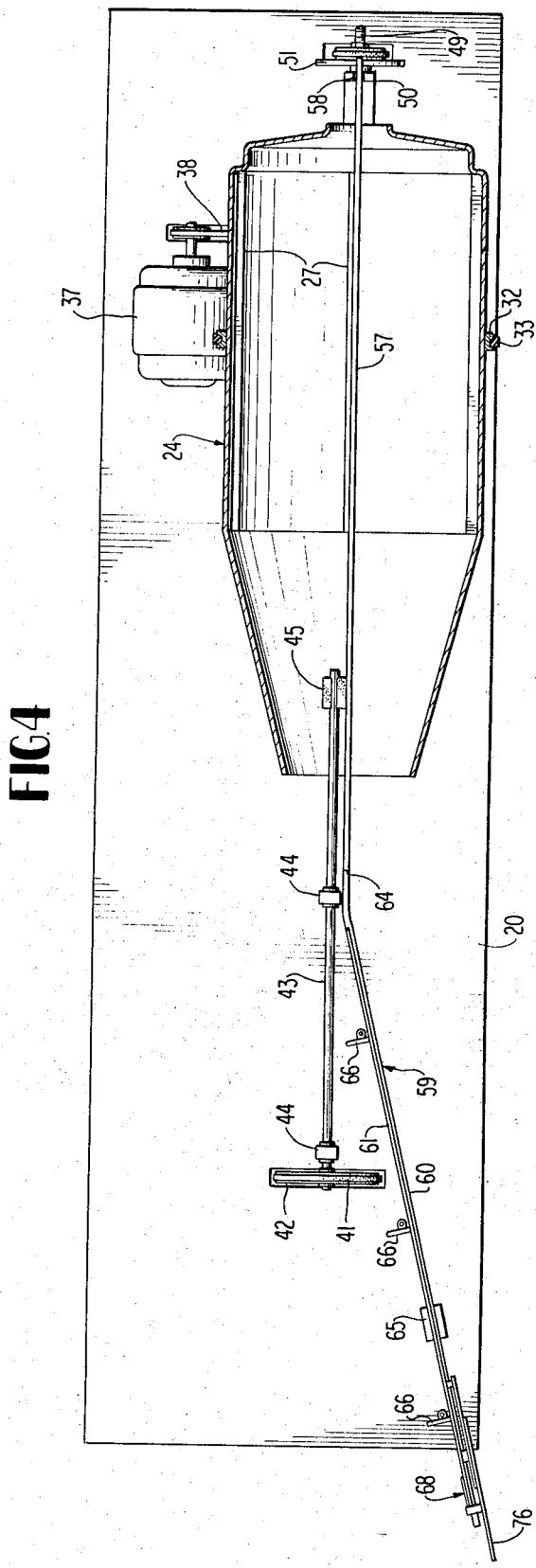
FIG. 4 is a horizontal section taken on line 4—4 of FIG. 1.

Referring to the drawings in detail wherein like numerals designate like parts throughout, the numeral 20 designates a suitable support table for the apparatus upon which are fixedly mounted forward and rearward pairs of laterally spaced upstanding mounting posts 21 and 22, having rollers 23 journaled on their upper ends for the support of a horizontal axis rotary tumbler drum 24.

This tumbler drum 24 has a main cylindrical section 25 forming a tumbler chamber for a random mass of fish hooks 26 of any given size which are placed therein. Generally, the mass of fish hooks will be entangled and matted due to their shapes and due to the action of their barbs and eyes. Within the tumbler chamber 25 at the periphery thereof and mounted a plurality, preferably four, circumferentially equidistantly spaced tumbler blades 27 which are quite narrow in the radial direction. The radial width of the tumbler blades is important and it has been discovered that if these blades project too far inwardly from the cylindrical side wall of the tumbler, they are less effective in separating the hooks from a tangled mass. The blades 27 extend for the full length of the cylindrical tumbler chamber 25, as shown.

Forwardly of the chamber 25, the tumbler drum 24 has a forwardly conically tapering extension 28, having a relatively wide forward open end 29, through which a fresh mass of hooks may readily be introduced into the tumbler. The tapered extension 28 also forms a safety shield around the pick-up bar and rotary hook rejecting mechanism, to be described, to prevent rejected hooks from flying about. The tapered extension also serves to convey rejected hooks back into the cylindrical tumbler chamber 25 for recycling. Therefore, it may be seen that the configuration of the tumbler drum and its internal parts are important to the proper overall functioning of the apparatus. The rearward end of the drum 24 is partially closed by an end wall 30 which has a more restricted central opening 31 receiving the rear end portion of the pick-up bar, soon to be described.

Rotation at the desired speed is imparted to the tumbler drum 24 by a large pulley 32 on the periphery thereof driven by a belt 33 which is engaged with and driven by a driving pulley 34 on a line drive shaft 35 beneath the table 20, supported by suitable bearings 36. The pulley 34 is preferably an adjustable diameter cone pulley of the type depicted in FIGS. 14 and 15 and this pulley will be described in further detail in connection with another critical component of the apparatus requiring adjustment of its rotational speed. The speed of the tumbler drum 24 must be matched or selected carefully with the particular size and weight of fish hooks passing through the apparatus. Different sizes of hooks naturally have different weights and differ in degrees of inertia. If the tumbler drum rotates too fast for a given hook size, the latter will tend to overshoot the pick-up bar and if the drum is rotating too slowly, the hooks will tend to fall short of the bar. Consequently, the rotation of the drum must be "tuned" to a particular size of hook being processed at any given time and this is the reason for providing the adjustable speed pulley 34.

The drive shaft 35 is driven from an electric motor 37 on the table 20 through a driving belt 38 and a pulley 39 on the drive shaft 35. At its forward end, the drive shaft 35 carries another pulley 40 operating a belt 41 which drives a pulley 42 on the forward end of an overhead horizontal shaft 43 mounted on suitable bearing supports 44 secured to the table 20. The rearward end of the rotary shaft 43 projects into the tapered extension 28 of the drum 24, slightly eccentrically thereof, FIG. 3, and carries a preferably single blade rotor element 45 formed of rubber or rubber-like material and held snugly in a cross slot of the shaft 43. The operation of the rotor element or blade 45 is quite critical in the invention and will be further described in connection with FIGS. 6 and 7. It has been discovered that no other type of rotor, such as a bristle brush rotor or a rigid blade rotor, will perform satisfactorily for rejecting the improperly oriented fish hooks. The rubber-like roor blade 45 must be adjustable to accommodate hooks of different sizes and must have a proper degree of sweep to reject the hooks while avoiding entanglement with the hooks themselves after their removal from the pick-up bar. To facilitate this, the rubber-like blade 45 may be replaced in the cross slot of the shaft 43 by a different blade of slightly different radial dimensions when required. Also to avoid the possibility of rejected hooks landing on the shaft 43, the diameter of this shaft is made slightly larger than the bight portion of the largest size hook handled by the machine. The projection of the blade 45 from two diametrically opposite sides only of the shaft 43 also prevents entanglement of rejected hooks with the rotor structure. This has been a critical feature of the apparatus to develop and the particular rotor arrangement shown and described is thought to be the only one which will efficiently perform the function in question.

At its rearward end, the drive shaft 35 carries another pulley 46 operating a belt 47, driving a pulley 48, FIGS. 14 and 15, on a short cam shaft 49 supported on an upstanding bar 50 or mount suitably fixed to the table 20. The shaft 49 supports a rotary vibration-inducing cam 51 having circumferentially spaced stepped cam lobes 52. The cam 51 is suitably attached to one side of the driving pulley 48 and this pulley is of the variable diameter type shown in FIGS. 14 and 15. It comprises two cone pulley sections 53 and 54 on a reduced extension 55 of shaft 49, which extension is screw-threaded to accommodate an adjusting nut 56 by means of which the pulley diameter in relation to the belt 47 is rendered readily adjustable. The need for this adjustment is founded on the fact that the frequency of vibration of the pick-up bar, to be described, must be varied in accordance with the size and weight of various fish hooks, and a single frequency of vibration will not suffice in the processing of all sizes of hooks. The identical pulley construction described in connection with FIGS. 14 and 15 is employed in connection with the previously mentioned variable pulley 34 which controls the speed of rotation of drum 24.

A fish hook pick-up bar 57 extends longitudinally through the rotary drum 24 substantially centrally thereof and at a slight downward inclination from the rear toward the front of the apparatus. The pick-up bar 57 is a relatively thin blade-like bar arranged on edge vertically within the tumbler drum and extending entirely therethrough and somewhat beyond the rear and forward ends thereof. The rear end of the pick-up bar is supported movably in a vertical slot 58, FIG. 5, formed in the top of the support bar 50, the rearward extremity of the pick-up bar resting upon the periphery of the rotary cam 51 so as to be repeatedly raised and lowered in a vibratory manner by tripping over the lobes 52 as the cam rotates in the direction of the arrow, FIG. 5. In this manner, the desired degree of vibration is constantly imparted to the pick-up bar by the cam 51 and the frequency of vibration can be adjusted through the variable pulley 48, as described, to accommodate various fish hook sizes.

Figure 6:
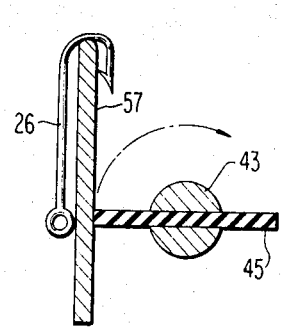
FIG. 6 is an enlarged fragmentary vertical section taken through the pick-up bar and an adjacent rotary device which removes certain fish hooks improperly arranged on the pick-up bar.
Figure 7:
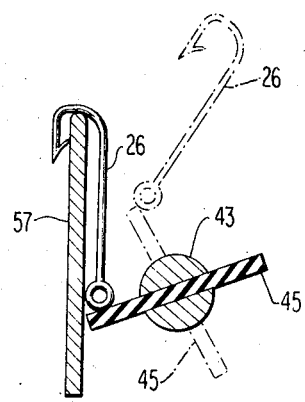
FIG. 7 is a sectional view similar to FIG. 6 showing the operation of the device for removing or rejecting certain fish hooks on the pick-up bar.

Referring to FIGS. 6 and 7, the fish hook rejecting rotor blade 45 rotates close to one side of the vibratory pick-up bar 57 and any fish hooks 26 whose shanks lie on the vertical side of the pick-up bar adjacent the rotor blade 45 will be ejected or rejected in the manner shown in FIG. 7. These rejected hooks will fall back into the rotating tapered extension 28 of the drum and will be conveyed back gradually into the tumbling chamber 25 for recycling. The hooks 26 which lie on the remote side of the bar 57, FIG. 6, are properly oriented for continued processing and are uneffected by the operation of the rotor blade 45. The criticality of the rubber-like rotor blade 45 has previously been discussed, along with the fact that the blade 45 and the shaft 43 are constructed to resist entanglement with the falling ejected hooks.

When the properly oriented fish hooks 26 pass forwardly of the ejecting rotor, they will ultimately travel beyond the forward end of the drum 24 and will approach a somewhat more steeply inclined vibrating feed bar assembly 59 consisting of a feed bar body 60 and an overlying gage bar 61 which is coextensive with the feed bar body substantially and defines with the top edge thereof a gaging slot or passage 62. As shown in FIGS. 8 and 9, the rear end of feed bar body 60 is welded at 63 to the leading end of pick-up bar 57 in such a way that an abrupt step 64 or drop-off point is formed at the junction of the two welding renders The weldingrenders the two bars integral so that the vibration induced by the cam 51 is carried forwardly to the pick-up bar assembly 59 without the need for any additional vibration means. The forward end of the assembly 59 is suitably supported on the table 20 in such a manner that the bar assembly will not be displaced from the table and vibration is not interfered with. For example, the forward end of the bar body 60 may rest on a suitable bearing support 65 formed of or lined with rubber-like material which merely grips the bar 60 yielding so as to stabilize it.

The provision of the step 64 is another critical feature required for the completely successful handling of the fish hooks 26. Occasionally, the otherwise correctly oriented hooks will approach the end of the pick-up bar 57 in crossed pairs as shown in two instances in FIG. 8. As such pairs reach the step 64, the underlying hook of the pair will drop onto the feed bar body 60 a brief instant before the upper hook of the same crossed pair, whereby the two hooks will be properly separated after they both drop over the step and onto the bar body 60. This is depicted in FIGS. 8 and 9, the latter figure showing the underlying hook of the crossed pair already descended from the step and moving down the bar 60 while the second hook is about to descend from the pick-up bar 57 to the feed bar body 60. This feature of the step 64 thus assures the final separation and proper orientation of all hooks passing onto the feed bar assembly 59.

The previously mentioned gage bar 61 is rendered readily adjustable relative to the bar 60 by a series of U-shaped resilient loops 66 spaced along the feed bar assembly 59 and having respective ends welded to the gage bar 61 and feed bar body 60, as shown in FIG. 10. The loops 66 may be adjusted between their ends by threaded adjusting means 67 spaced from one side of the bar assembly 59 to thereby vary the width of the gage slot 62. The purpose of this gage slot is to admit and guide oriented fish hooks of one given size only as they pass forwardly toward the counting or grouping station. The arrangement of the adjusting means 66–67 beyond one side of the bar assembly 59 assures that there will be no entanglement with the moving hooks 26 as they travel along the feed bar assembly 59.

Near the discharge end or lower end of the feed bar assembly 59 is mounted a counting or grouping mechanism 68 which forms another major feature of the invention. The operation of this mechanism 68 is graphically shown in drawing FIGS. 11, 12 and 13. In these figures, the mechanism 68 includes a stop element 69 pivoted at 70 to the lower end of gage bar 61. An anchor bar 71 is fixedly secured to the bar 61 somewhat upstream from its lower end, and below this anchor bar in crossing relation an arm 72 is pivotally attached at 73 to the gage bar 61. The two bars 71 and 72 are connected by a retractile spring 74 and a stop pin 75 on the fixed bar 72 serves to limit upward movement of the arm 72. The arm 72 carries a counting or grouping blade 75 having a sharply beveled lower edge for engaging between fish hooks 26 accumulating near the bottom of the feed bar assembly. A manual handle or lever 76 is pivoted at 77 near the center of the arm 72 and carries a stop release element 78 adapted to contact and raise the stop element 69 when the handle is depressed. Another retractile spring 79 interconnects the handle 76 and the arm 72 and tends to bias the handle upwardly to the position shown in FIG. 11.

Figure 11:
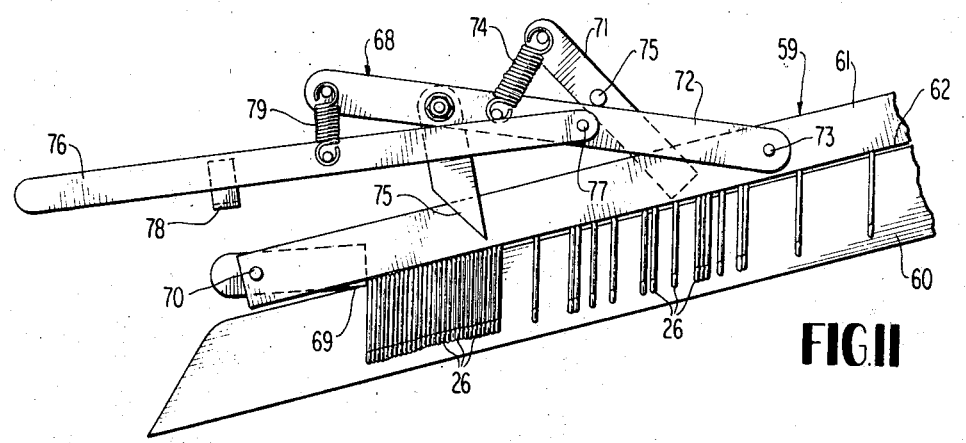
FIG. 11 is an enlarged fragmentary side elevation of a hook counting or grouping mechanism at the discharge end of the apparatus in a first position.
Figure 12:
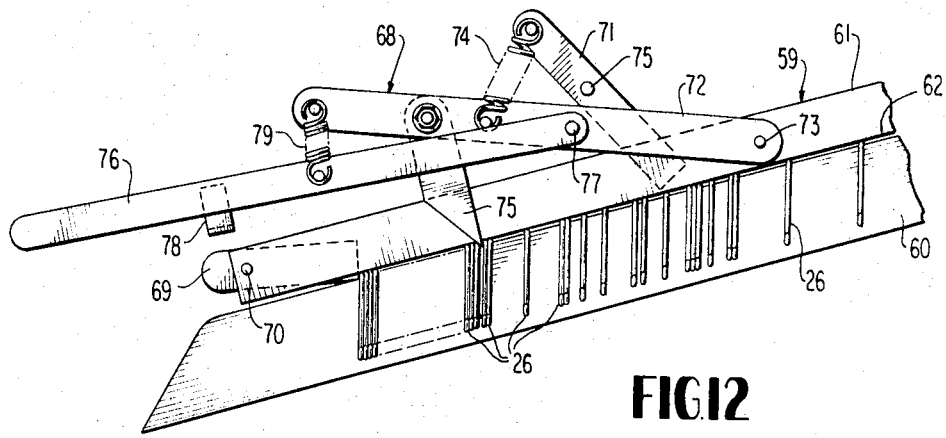
FIG. 12 is a similar view of the grouping or counting mechanism in a second position.

When the operator releases the handle 76 as shown in FIG. 11, the springs 74 and 79 hold the stop release element 78 and the counting or grouping blade 75 elevated to inactive positions. The fish hook stop element 69 remains by gravity in the active position to arrest the movement of fish hooks 26 along the feed bar body 60 so that they accumulate in stacked relation near the lower discharge end of the feed bar assembly. When a predetermined number of the hooks have accumulated against the stop element 69, which can be determined visually by the length of the stack in relation to the blade 75, the operator will depress the handle 76 as shown in FIG. 12 and the blade 75 will descend into contact with the stack of fish hooks to separate a definite group between the stop element 69 and the counting or grouping blade. At this time, the stop element 69, FIG. 12, is still active. The blade 75 is now beginning to serve as a stop element for the additional hooks 26 which are continually moving down the vibrating feed bar assembly 59.

Figure 13:
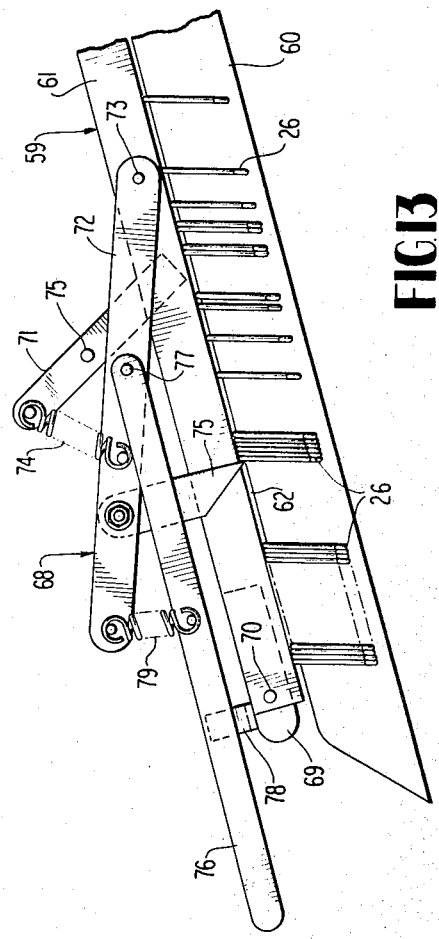
FIG. 13 is another similar view of the mechanism in a third operating position.

The final and complete lowering of the handle 76 by the operator shown in FIG. 13 moves the release element 78 into contact with the pivoted stop element 69 and elevates the leading end of the same to a release position with respect to the counted stack or group of hooks 26 separated from the other hooks by the blade 75. The blade 75 remains in the active position. The now released stack of hooks are now free to move off of the discharge end of the feed bar assembly into a package or for any further processing which may be necessary. When the handle 76 is released, the mechanism 68 will return automatically under influence of the springs to the position of FIG. 11 so that the process of grouping or counting hooks for the next package may commence. At this time, the blade 75 releases the hooks which have been accumulating against it, as shown in FIGS. 12 and 13, and these hooks now again begin to accumulate against the stop element 69 which is in the active position.

Figure 16:
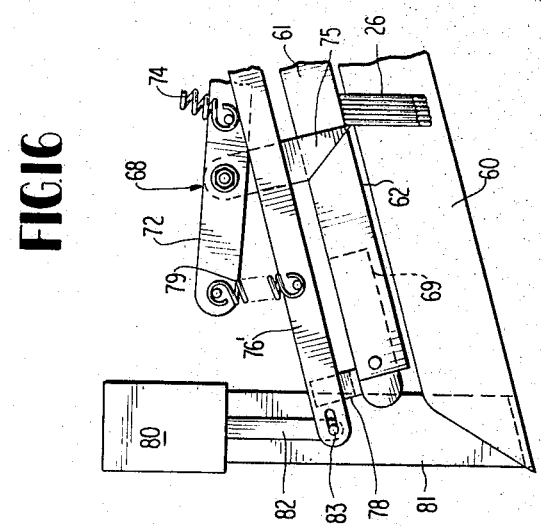
FIG. 16 is a view similar to FIG. 13 showing a modification of the grouping or counting mechanism where the latter is operated by a solenoid instead of manually.

FIG. 16 shows a modification of the grouping or counting mechanism 68 which is identical in construction and operation to the previously described mechanism except that a lever 76' replaces the manual handle 76 and is power-operated automatically at predetermined time intervals by an electrical solenoid or some similar power actuator, such as a pneumatic cylinder. The solenoid 80 may be secured by a bracket 81 to the lower end of bar 60 and its plunger rod 82 has a slotted connection at 83 with the terminal end of lever 76'. With this arrangement and a conventional control circuit with timing means, the counting or grouping mechanism 68 is rendered automatic and the operator may be dispensed with.

It should be understood that other known types of counting or grouping devices could be employed in lieu of the mechanism 68. However, this particular mechanism is simplified and is mechanically compatible with the present invention structure and forms a ready attachment thereto.

It should now be understood that the invention enables the placement of a random mass of fish hooks of a given size into the tumbler drum 24. The rotational speed of this drum and the speed of the vibration cam 51 are adjusted in accordance with the size of hook by the use of the adjustable diameter pulley 48. The tumbler drum deposits hooks continuously on the pick-up bar 57 where the hooks hang shank downwardly and move gradually toward the forward open end of the drum. The rotor blade 45 acts on the hooks 26 whose shanks are on one side of the pick-up bar and rejects these hooks which fall back into the tumbler drum for recycling. The other hooks, FIG. 6, pass by the rotor 45 and finally fall over the step 64 where any crossed pairs of hooks are separated, to complete the orientation and separation process. The hooks now travel down along the feed bar assembly 59 through the gaging slot 62 which is preset for hooks of one size. Finally the hooks are grouped and separated near the bottom of the feed bar assembly ready for packaging, as described.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A fish hook separating, feeding and grouping apparatus comprising in combination a substantially horizontal axis rotary tumbler drum for fish hooks placed therein in random masses, a single inclined pick-up bar extending generally axially through the tumbler drum to receive fish hooks from the drum with the hooks suspended from the pick-up bar shanks downwardly on either side of the pick-up bar, means to impart vibration continuously to the pick-up bar to induce movement of the suspended fish hooks forwardly on the pick-up bar, a rotary device near one side of the pick-up bar to engage the fish hook shanks on that side of the pick-up bar and remove such hooks from the pick-up bar and deposit them back into said drum for further tumbling, an inclined fish hook feed bar assembly extending forwardly of the pick-up bar and joined thereto rigidly so that vibrations of the pick-up bar are imparted to the feed bar assembly, there being an abrupt vertical step at the junction of the pick-up bar and feed bar assembly over which the moving fish hooks fall freely when passing from the pick-up bar to the feed bar assembly to thereby separate crossing pairs of hooks, and means near the lower end of the feed bar assembly to group predetermined numbers of fish hooks for packaging or further processing while temporarily arresting movement of oncoming fish hooks along the feed bar assembly.

2. The structure of claim 1, and said feed bar assembly comprising a feed bar body upon which the moving fish hooks are suspended with their shanks arranged on one side thereof, and an overlying substantially coextensive gage bar adjustably mounted above the feed bar body and forming with the top edge of the feed bar body a gaging slot through which the bights of the fish hooks must pass while traveling down the feed bar assembly toward the grouping means.

3. The structure of claim 2, and said feed bar assembly being more steeply inclined than said pick-up bar.

4. The structure of claim 1, and said single pick-up bar comprising a relatively thin blade-like bar arranged in a vertical plane edgewise.

5. The structure of claim 1, and power means to rotate said tumbler drum at a desired speed and to simultaneously operate the vibration imparting means at a desired speed, said power means including a pair of adjustable variable speed drive elements for said drum and vibration imparting means.

6. The structure of claim 5, and said vibration imparting means including a multiple lobe rotary cam engaging the lower edge of said pick-up bar and imparting rapid vertical oscillations thereto, and slotted support and stabilizing means for the pick-up bar near said cam.

7. The structure of claim 1, and said rotary device including a rotary shaft and a single rotor blade element formed of rubber-like material on said shaft and projecting radially and equidistantly beyond diametrically opposed sides of the shaft, said rotor blade element passing close to one vertical side of said pick-up bar and serving to brush suspended fish hooks upwardly at said side to separate them from the pick-up bar.

8. The structure of claim 7, and said rotary shaft having a diameter slightly larger than the bight of the largest fish hook processed by the apparatus.

9. The structure of claim 2, and plural spaced resilient loop elements having their ends rigidly anchored to corresponding sides of said gage bar and feed bar body and projecting outwardly of said corresponding sides, and adjustable screw-threaded elements interconnecting the opposite sides of said loop elements and being spaced from said corresponding sides of said gage bar and feed bar body and operable to adjust the width of said gaging slot.

10. The structure of claim 7, and power means common to the tumbler drum, vibration imparting means and said rotary device to operate the same in unison.

11. The structure of claim 1, and said means to group fish hooks comprising a stop element for the moving fish hooks near the discharge end of said feed bar assembly and being normally active, a normally inactive vertically movable blade element engageable with the fish hooks on the feed bar assembly to separate groups stacked against the stop element from other fish hooks moving on the feed bar assembly, and a mechanical linkage including an operating lever on the feed bar assembly and operable to deactivate said stop element and to substantially simultaneously activate the blade element.

12. The structure of claim 11, and a release element for said stop element mounted on said lever and movable thereby into contact with the stop element to release the latter from the active stopping position when the blade element is moved into group-forming relation with the fish hooks, the stop element being a pivoted element.

13. The structure of claim 11, and spring means connected with said linkage and normally maintaining it in an inactive position relative to the fish hooks.

14. The structure of claim 11, and said operating lever comprising a manual lever.

15. The structure of claim 11, and a power actuator for said lever to move the same at predetermined time intervals automatically to accomplish the grouping of said fish hooks.

* * * * *